E. S. JONES.
CORN HUSKING MACHINE.
APPLICATION FILED AUG. 7, 1912.
1,051,500.
Patented Jan. 28, 1913.
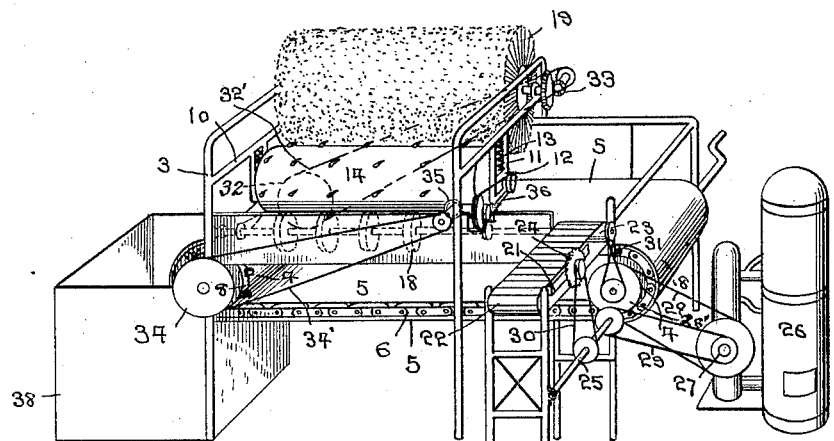
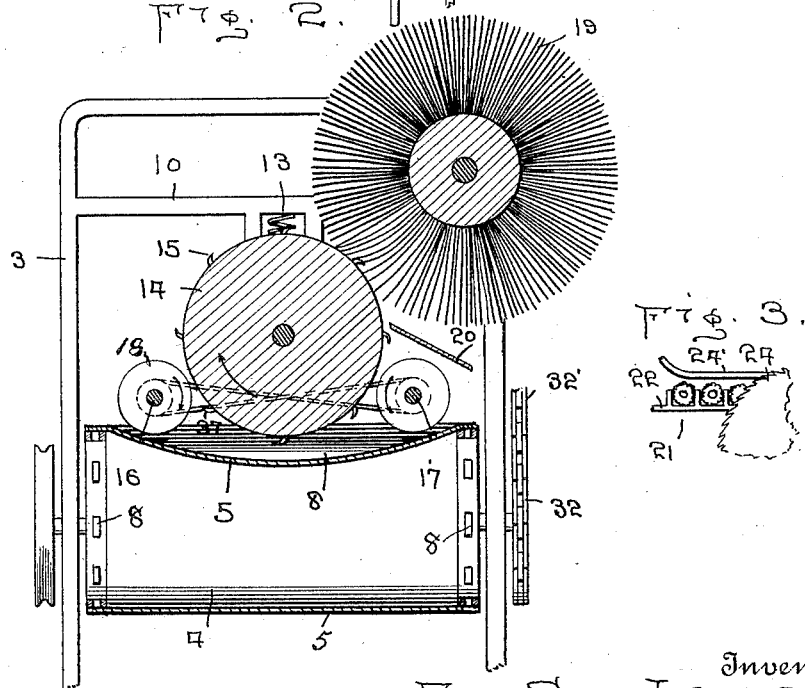

UNITED STATES PATENT OFFICE.

EDWARD S. JONES, OF MOBILE, ALABAMA, ASSIGNOR OF ONE-FIFTH TO ASHBELL HUBBARD, OF MOBILE, ALABAMA.

CORN-HUSKING MACHINE.

1,051,500. Specification of Letters Patent. Patented Jan. 28, 1913.

Application filed August 7, 1912. Serial No. 713,824.

*To all whom it may concern:*

Be it known that I, EDWARD S. JONES, a citizen of the United States, residing at Mobile, in the county of Mobile and State of Alabama, have invented certain new and useful Improvements in Corn-Husking Machines; and I do hereby declare the following to be a full, clear, and exact description of the invention, such as will enable others skilled in the art to which it appertains to make and use the same.

My invention relates to new and useful improvements in corn husking machines. The prime object of my invention is to provide a machine which will remove the husks from ears of corn and deposit the cleaned ears at one end of the machine and the husks in any other desired place.

Other objects and advantages of my invention will be hereinafter made clearly apparent in the specifications and pointed out in the claims.

In the accompanying drawings I have shown the preferred form which my invention may take.

In said drawings, Figure 1 is a perspective view showing the preferred form of my invention. Fig. 2 is a transverse sectional view thereof on an enlarged scale, and, Fig. 3 is a detail view showing the relation of the endless conveyer or saw carriage to the saw, and corn being operated upon thereby.

Referring to the drawings by numerals of reference, similar numerals designating corresponding parts throughout the several views, 3 is a frame in which are journaled a pair of rollers 4. Said rollers 4 are arranged transversely of the machine and adapted to receive an endless conveyer belt 5 thereon, which is formed of any suitable flexible material and is preferably provided with substantially non-elastic transmission elements, such for instance as sprocket chains 6, at its edges. The two rollers 4 are caused to move in unison by means of the endless chains 6, which engage a pair of sprockets 8, secured on the ends of the respective rollers 4. These chains support the edges of the conveyer belt, so that said edges, on the working part of the conveyer, are supported above the longitudinal center of the belt, the latter being so formed as to sag, on having its longitudinal center depressed, so that the ears of corn will roll to the depressed middle portion thereof and remain disposed axially parallel with the shucking roller, while being carried thereunder. Obviously various constructions of centrally depressed conveyer belts are applicable in a machine of this character, and the invention is not limited by the foregoing description thereof.

The frame 3 is provided with cross bars 10 and said cross bars are provided with downwardly extending U-shaped supporting brackets 11, which are adapted to receive bearing blocks 12. The bearing blocks 12 are normally held at the lower portion of the brackets 11 by means of coil springs 13.

The shucking roller or drum 14 of my machine is journaled in the bearing blocks 12, said drum being provided with a plurality of spurs of shucking teeth 15, which are preferably bent slightly in the direction of rotation of the shucking drum, as clearly indicated in Fig. 2. The shafts 16 and 17 are arranged parallel to and below the shucking drum 14 and are each provided with a plurality of disks 18, which are arranged in close proximity to the shucking drum 14, said disks being of less diameter than the drum and being overhung thereby. The shafts 16 and 17 are arranged so that the rollers or disks 18 carried thereby will be rotated downward toward the depressed center of the belt, so as to prevent the corn from rising from the belt; and for this purpose, I preferably form the disks 18 of rubber, leather or other material adapted to retain a frictional surface, and will not wear out quickly.

Journaled in the upper portion of the frame is a rotary brush 19, which is of greater diameter than the shucking drum 14 and arranged to travel in the opposite direction, whereby any shucks held upon the shucking teeth 15 will be removed therefrom and deposited upon an inclined platform 20 secured to portions of the frame and preferably arranged parallel with the axis of the shucking drum and extending to a point where the shucks will slide therefrom to one side of the frame 3 or into any desired receptacle, (not shown).

A feeding table 21 is arranged at the front end of the machine and at the left side thereof and is provided with an endless belt 22, traveling on drums 23, which are mounted at opposite sides of the table. The endless belt 22 is provided at intervals with outwardly extending and transversely arranged ribs 9 which form pockets adapted to receive the unshucked ears as they are fed to the machine. A rotary saw 24 is mounted adjacent to one side of the feeding table 21 and is adapted to be operated from a shaft 25, journaled in the frame of the table.

The different parts of the machine are adapted to be run from any suitable source of power 26. As shown in the drawings, the drive shaft 27 of the power plant is connected by belting 28 to a pulley 28' on the front drum 4, and it is also connected by belting 29 to a pulley on the shaft 25, the latter being connected by pulleys 25' and 25ª and belting 30 to the rotary saw 24; and the shaft of the front drum 4 is connected, by belting 31, to one of the drums 23 for actuating the feeding belt 22; said belting 30 and 31 being arranged to move the feeding belt and rotary saw in opposite directions. The rear drum 4 is connected by a sprocket 32, chain 32' and gearing 33 to the rotary brush 19, and by a pulley 34, belting 34', gearing 35 and belting 36, to the shucking drum 14. The shafts 16 and 17 are connected by a crossed belt 37, so that the rotation of said shafts will be in opposite directions, as indicated in Fig. 2, and shaft 16 is extended and secured to the inner drum 23 so as to be operated thereby.

A spring or other suitable element may be employed for folding the ears down against the action of the saw 24, as indicated at 24', in Fig. 3.

When the machine is being driven from the source of power, the operator places the unshucked ears of corn upon the feeding belt 22 and between the ribs 9 with the stem end of the ear to the right and the ear will be carried by said ribs against the saw, which will cut the stem or nub therefrom. The ear is carried by the belt 22 and thereby dropped upon the belt 5, whereupon it will roll to the depressed center of the latter. The belt 5 will carry the ear under the shucking roller 14 and between the sets of disks 18 and the shuck upon said ear will be engaged by the teeth 15 of the shucking roller and will be removed therefrom.

By referring to the arrows in Fig. 2, it will be seen that the ear will be carried toward the rollers 18 upon the shaft 16 and will be given a rotary movement between the shucking drum and said rollers whereby all portions of the shucks will be removed, said shucks being carried by the teeth 15 in the direction indicated by the arrows, until the brush drum 19 is reached. The brush drum 19, which, as hereinbefore described, is rotated faster than the shucking drum, will remove the shucks from the teeth and will direct the same upon the inclined platform 20, from whence they will slide by gravity into any suitable receptacle (not shown). The ears after having the shucks removed will be carried from under the shucking drum by the endless belt 5 and are adapted to be directed into a receptacle 38 arranged at the end of the frame. By providing the flexible belt for carrying the ears of corn under the shucking roller, the ears of corn will be yieldingly held against the shucking roller, and by providing the roller with springs 13, it will be seen that the roller will work upwardly against the tension of said springs whenever an extra large ear of corn is carried thereunder.

From the foregoing description it will be seen that I have provided a machine whereby the shucks may be readily and rapidly removed from ears of corn.

Having thus fully set forth my invention, further description is deemed unnecessary.

What I claim as new is:

1. A device of the class described comprising a frame, a belt arranged longitudinally of said frame, a shucking drum arranged longitudinally of said belt, rollers arranged axially parallel with said shucking drum and in close proximity thereto, the lower edge of each of said rollers being disposed slightly below the plane of said belt, and a brush drum arranged longitudinally of the machine and bearing against the shucking drum, and means to operate said drums and rollers.

2. A machine of the class described comprising a frame, a belt arranged to travel longitudinally of said frame, a shucking drum mounted for rotation above said belt, a plurality of rollers mounted to rotate in axially parallel relation with said shucking drum and co-acting with said belt for holding ears of corn in contact with the shucking drum, and a brush mounted for rotation in the same direction and in contact with the shucking drum and at a different speed and thereby adapted to remove the shucks from said shucking drum and direct the shucks to one side of the machine.

3. A machine of the class described, comprising a feed belt, a shucking drum mounted for rotation above the feed belt on an axis extending longitudinally of the belt, springs normally holding said drum down toward said belt, two concentric sets of disks mounted axially parallel with said drum, said disks being of less diameter than the shucking drum and having their lateral surfaces overhung by those of the shucking drum and thus being coöperatively related with the latter for removing the shuck from ears of corn on the belt, and means for removing shucks from the said shucking drum.

In testimony whereof I have signed my name to this specification in the presence of two subscribing witnesses.

EDWARD S. JONES.

Witnesses:
MARGUERITE R. KENYON,
D. M. HARDEN.

Copies of this patent may be obtained for five cents each, by addressing the "Commissioner of Patents, Washington, D. C."